US009336976B2

(12) United States Patent
Chen et al.

(10) Patent No.: US 9,336,976 B2
(45) Date of Patent: May 10, 2016

(54) RELAY DRIVING DEVICE AND METHOD FOR DRIVING A RELAY

(71) Applicant: LITE-ON ELECTRONICS (GUANGZHOU) LIMITED, Guangzhou (CN)

(72) Inventors: Chih-Tai Chen, Taipei (TW); Ming-Yang Tsai, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 586 days.

(21) Appl. No.: 13/783,744

(22) Filed: Mar. 4, 2013

(65) Prior Publication Data

US 2014/0049114 A1 Feb. 20, 2014

(30) Foreign Application Priority Data

Aug. 17, 2012 (CN) .......................... 2012 1 0298679

(51) Int. Cl.

*H02J 1/00* (2006.01)
*H01H 47/22* (2006.01)
*H01H 47/32* (2006.01)

(52) U.S. Cl.

CPC ............. *H01H 47/22* (2013.01); *H01H 47/325* (2013.01); *Y10T 307/675* (2015.04)

(58) Field of Classification Search

CPC ........................................................ G06F 1/26
USPC ........................................... 307/75; 361/160
See application file for complete search history.

(56) References Cited

U.S. PATENT DOCUMENTS 7,268,994 B2 * 9/2007 Kondo ................ H01H 47/002 361/160

* cited by examiner

*Primary Examiner* — Stephen W Jackson
(74) *Attorney, Agent, or Firm* — Rosenberg, Klein & Lee

(57) ABSTRACT

A relay driving device includes first and second power supply modules, a switching circuit, and a control module. The first power supply module outputs a first voltage that has a magnitude sufficient to activate the relay. The second power supply module outputs a second voltage that has a magnitude sufficient to maintain an activated state of the relay. The control module is configured to control the switching circuit to connect the relay to the first power supply module so as to provide the first voltage to the relay for activating the relay, and to subsequently connect the relay to the second power supply module so as to provide the second voltage to the relay for maintaining the activated state of the relay.

14 Claims, 5 Drawing Sheets

RELAY DRIVING DEVICE AND METHOD FOR DRIVING A RELAY

CROSS-REFERENCE TO RELATED APPLICATION

This application claims priority of Chinese Application No. 201210298679.8, filed on Aug. 17, 2012.

BACKGROUND OF THE INVENTION

1. Field of the Invention

The invention relates to a driving device, more particularly to a driving device that is configured to drive a relay.

2. Description of the Related Art

In a conventional power converter structure (e.g., a power supply), an inrush current that occurs at the time when the power converter is activated has an undesirably large magnitude and thus is a common problem that needs to be addressed. Typically, a relay is used to suppress such inrush current. Specifically, when the power converter is activated, the relay is configured to direct the inrush current to a current suppresser such as a resistor, a thermistor or the like that is able to handle instantaneous large current. Therefore, the effect of the inrush current can be nullified. The relay is further configured to short-circuit the current suppressor after the inrush current has dissipated, allowing the power converter to operate normally for providing power.

However, the relay itself is an electrical component that consumes power during operation. Specifically, the relay needs a power to enter an activated state, and to stay in the activated state. It can be seen that when the relay is connected to the power converter, the power conversion efficiency of the power converter with the relay is reduced as compared with a power converter without the relay.

Some solutions have been proposed to alleviate reduction of the power conversion efficiency of the power converter resulting from inclusion of the relay. For example, the electrical components of the power converter and/or the relay can be replaced with ones configured for better performance. The circuitry arrangement of the power converter and/or the relay can be redesigned to achieve the similar effect. Nonetheless, the better performing electrical components can be somewhat costly, and redesign of circuitry arrangement is time-consuming.

SUMMARY OF THE INVENTION

Therefore, the object of the present invention is to provide a relay driving device that is able to reduce the power consumption of the relay, thereby increasing the power conversion efficiency of the power converter.

Accordingly, a relay driving device of the present invention is for driving a relay. The relay driving device comprises first and second power supply modules, a switching circuit, and a control module.

The first power supply module is for outputting a first voltage that has a magnitude sufficient to activate the relay. The second power supply module is for outputting a second voltage that has a magnitude lower than that of the first voltage and sufficient to maintain an activated state of the relay.

The switching circuit is coupled to the first and second power supply modules, and is to be coupled to the relay.

The control module is coupled to the switching circuit and is configured to control the switching circuit to connect the relay to the first power supply module and to disconnect the relay from the second power supply module so as to provide the first voltage to the relay for activating the relay. The control module is further configured to subsequently connect the relay to the second power supply module and to disconnect the relay from the first power supply module so as to provide the second voltage to the relay for maintaining the activated state of the relay.

Another object of the present invention is to provide a method for driving a relay. The method is to be implemented by a relay driving device electrically connected to the relay.

Accordingly, the method of this invention comprises the following steps of:

configuring the re lay driving device to output a first voltage to the relay, the first voltage having a magnitude that is sufficient to activate the relay; and configuring the relay driving device to output a second voltage to the relay for maintaining an activated state of the relay, the second voltage having a magnitude lower than that of the first voltage.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
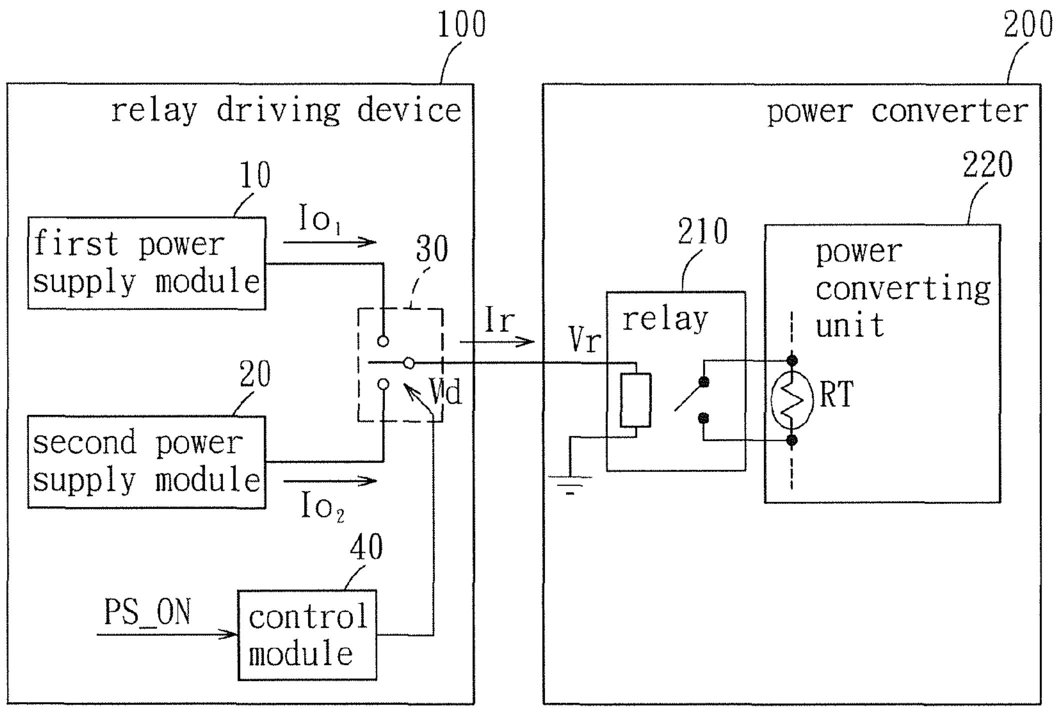
FIG. 1 is a schematic block diagram of a preferred embodiment of a relay driving device according to the invention.

As shown in FIG. 1, the preferred embodiment of a relay driving device 100 according to the present invention is configured to be connected to a power converter 200 that includes a relay 210. The relay driving device 100 may be connected to other power devices including a relay in other embodiments. In this embodiment, the relay 210 has a primary side that is to be connected to the relay driving device 100, and a secondary side connected to a power converting unit 220. The relay driving device 100 of this invention uses two different voltages to drive the relay 210 in order to reduce power usage of the same.

The relay driving device 100 comprises a first power supply module 10, a second power supply module 20, a switching circuit 30, and a control module 40.

The first power supply module 10 is for outputting a first voltage ($Vo_1$) that has a magnitude sufficient to activate the relay 210. The second power supply module 20 is for outputting a second voltage ($Vo_2$) that has a magnitude lower than that of the first voltage ($Vo_1$) (i.e., not sufficient to activate the relay 210) and sufficient to maintain an activated state of the relay 210. It is noted that the magnitude of the second voltage ($Vo_2$) is configured to be not less than a lowest excitation voltage of the relay 210.

The switching circuit 30 is coupled to the first and second power supply modules 10 and 20, and is to be coupled to the relay 210. In operation, the switching circuit 30 is configured to electrically interconnect one of the first and second power supply modules 10 and 20 to the relay 210. The switching circuit 30 can be implemented using mechanical components, or semiconductor components such as a metal-oxide-semiconductor field effect transistor (MOSFET), a bipolar junction transistor (BJT), a diode, an insulated-gate bipolar transistor (IGBT), etc. The control module 40 is coupled to the switching circuit 30, and is for controlling operation of the same.

Figure 2:
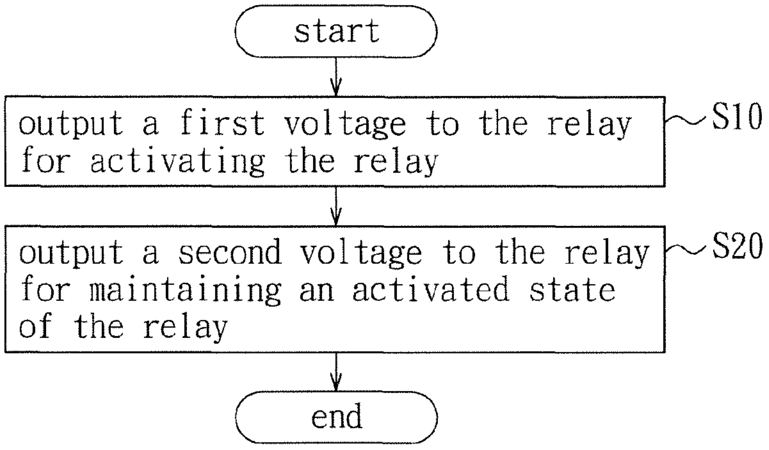
FIG. 2 is a flow chart of a method for driving a relay using the relay driving device, according to the preferred embodiment.
Figure 3:
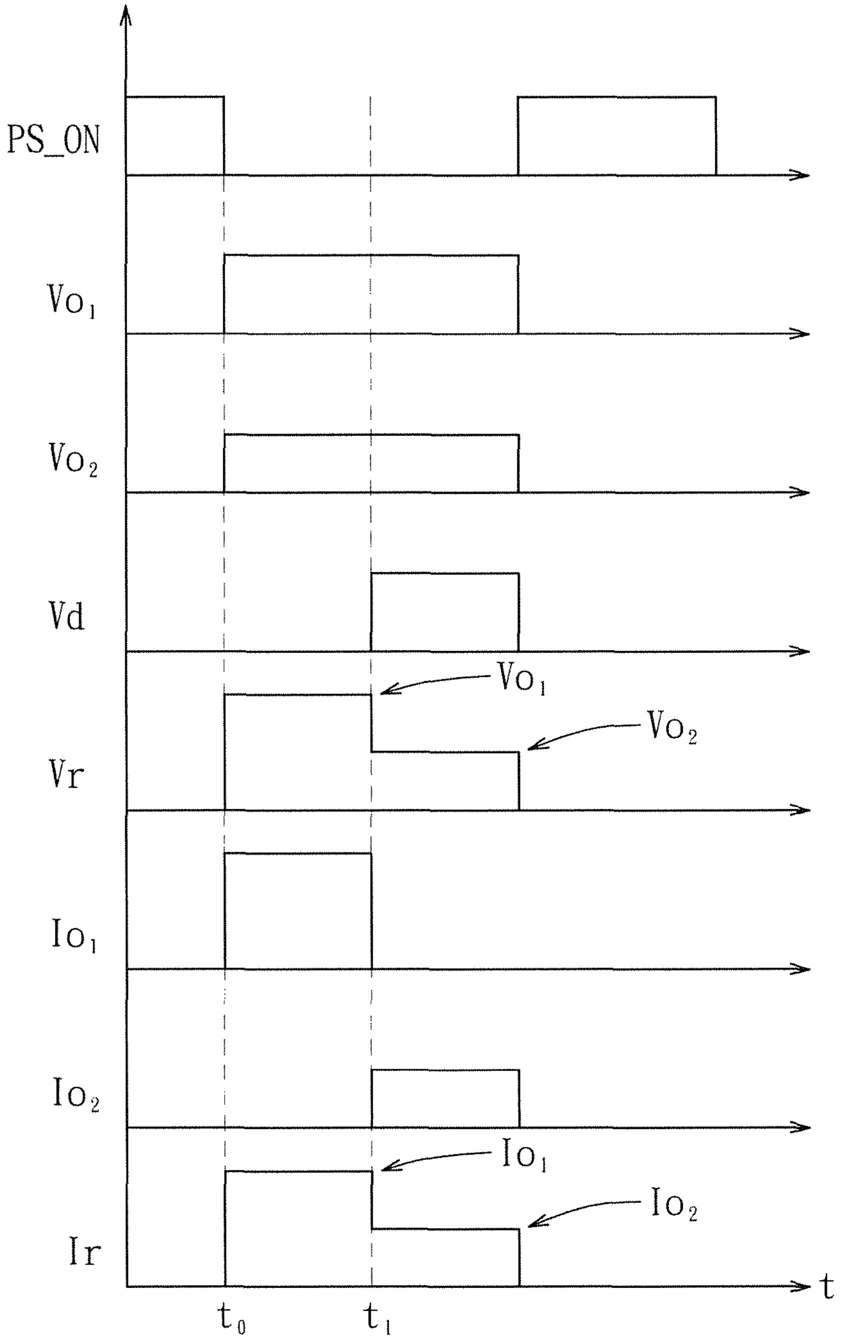
FIG. 3 is a timing diagram illustrating states of various voltage and current signals during operation of the relay driving device of FIG. 1.
Figure 4:
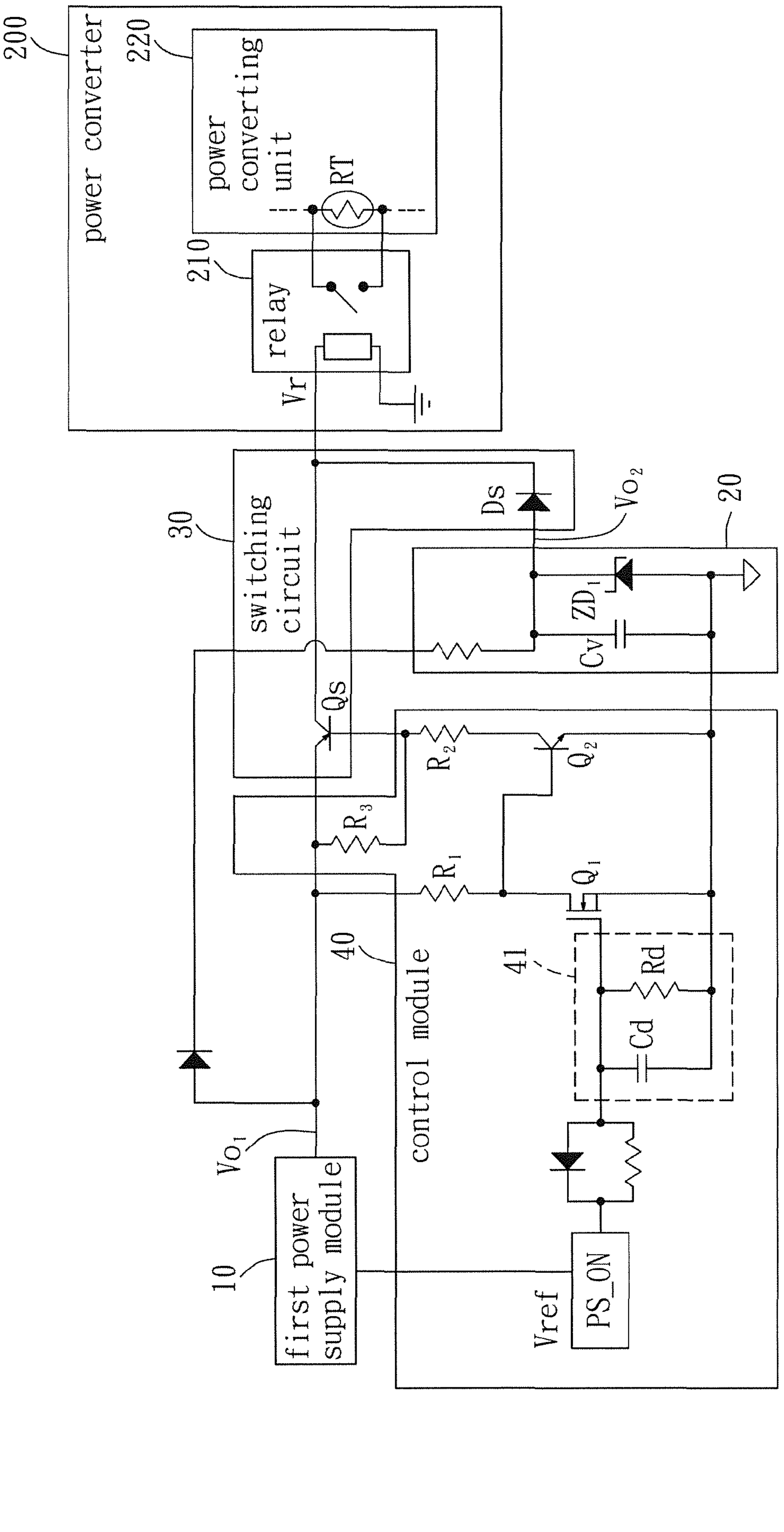
FIG. 4 is a detailed schematic circuit diagram showing the relay driving device of FIG. 1, according to an example.

Referring to FIGS. 2 to 4, a method for driving the relay 210 using the relay driving device 100 will now be described.

In step S10, when the relay driving device 100 is activated at a time $t_0$ (e.g., a power switch being pressed), the relay driving device 100 is configured to output the first voltage ($Vo_1$) to the relay 210. To be more specific, at the time $t_0$, a power-on signal (PS_ON) that is fed to the control module 40 switches from a high voltage level to a low voltage level, and the first and second power supply modules 10 and 20 respectively output the first and second voltages ($Vo_1$) and ($Vo_2$). The control module 40 receives the power-on signal (PS_ON) and accordingly outputs a control signal (Vd) to the switching circuit 30. In this embodiment, a low voltage level of the control signal (Vd) implies that the first power supply module 10 is electrically connected to the relay 210 through the switching circuit 30, and the second power supply module 20 is disconnected from the relay 210. As a result, the relay 210 is fed with the first voltage ($Vo_1$) which has a magnitude sufficient to activate the relay 210.

Then, as shown in step S20, after the first voltage ($Vo_1$) has been outputted for a predetermined time, the relay driving device 100 is configured to output the second voltage ($Vo_2$) to the relay 210 at a time $t_1$. Specifically, the control module 40 outputs the control signal (Vd) at a high voltage level. Thus, the first power supply module 10 is disconnected from the relay 210, and the second power supply module 20 is electrically connected to the relay 210 through the switching circuit 30. Subsequently, the second voltage (Vo2) is fed to the relay 210.

It is noted that, typically, the relay 210 requires to be fed with the first voltage ($Vo_1$) for a certain time period to be activated. Since the magnitude of the second voltage ($Vo_2$) is not sufficient to activate the relay 210, the predetermined time after which the relay driving device 100 outputs the second voltage ($Vo_2$) must be longer than the aforesaid certain time period.

In brief, the relay driving device 100 that implements the aforesaid method is configured to first provide the first voltage ($Vo_1$) to the relay 210, and to subsequently provide the second voltage ($Vo_2$) to the relay 210. Since the magnitude of the second voltage ($Vo_2$) is lower than that of the first voltage ($Vo_1$), and is sufficient to maintain the relay 210 in the activated state, the operation of the relay 210 in turn consumes less power, resulting in a better power conversion efficiency for the power converter 200.

The following table illustrates experimental results of the power consumptions of the relay 210 when the power converter 200 is under different loadings (i.e. at 50% and 100%, respectively), in both cases where the relay 210 is operated individually, and where the relay driving device 100 is present. In both cases the first voltage ($Vo_1$) is set at 12 volts, the second voltage ($Vo_2$) is set at 5 volts, and the power converter 200 is configured to supply a 250-watt power.

TABLE 1

| relay power consumption | Power converter loading 20% | 50% | 100% |
|---|---|---|---|
| without the relay driving device (Watt) | 54.956 | 138.656 | 285.356 |
| with the relay driving device (Watt) | 54.7 | 138.4 | 285.1 |
| Difference (Watt) | 0.256 | 0.256 | 0.256 |
| power conversion efficiency improvement (%) | 0.411 | 0.167 | 0.078 |

As seen in table 1, the relay driving device 100 is able to reduce the power consumption of the relay 210 by a flat 0.256 watt. This power consumption reduction in turn increases the power conversion efficiency of the power converter 200.

FIG. 4 is a schematic circuit diagram illustrating the detailed circuit arrangement of the second power supply module 20, the switching circuit 30, and the control module 40 in accordance with an example. In this example, the first power supply 10 can be an external voltage source that supplies the first voltage ($Vo_1$), and is activated in response to a power-on signal (PS_ON) switching from a high voltage level to a low voltage level. The power-on signal (PS_ON) can be provided by an external reference voltage (Vref).

The second power supply module 20 includes a voltage dividing capacitor (Cv), a Zener diode ($ZD_1$) coupled across the voltage dividing capacitor (Cv), and a voltage dividing resistor electrically connected to the first power supply module 10. In this example, the second power supply module 20 is disposed to receive the first voltage ($Vo_1$) from the first power supply module 10, and the second voltage ($Vo_2$) is a divided voltage of the first voltage ($Vo_1$), the divided voltage being across the voltage dividing capacitor (Cv) and the first Zener diode ($ZD_1$).

The switching circuit 30 includes a switching transistor (Qs) for coupling the first power supply module 10 to the relay 210, and a switching diode (Ds) for coupling the second power supply module 20 to the relay 210. In this embodiment, the switching transistor (Qs) is a PNP bipolar junction transistor (BJT) having a base serving as a control terminal, an emitter serving as a first terminal, and a collector serving as a second terminal. The switching diode (Ds) has an anode electrically connected to the second power supply module 20, and a cathode to be electrically connected to the primary side of the relay 210.

The control module 40 of this embodiment includes a delay circuit 41, a first transistor ($Q_1$), a first resistor ($R_1$), a second transistor ($Q_2$), a second resistor ($R_2$), and a third resistor ($R_3$).

In this example, the delay circuit 41 is an RC circuit, and includes a delay capacitor (Cd) and a delay resistor (Rd) connected in parallel to each other. The delay circuit 41 is for receiving the power-on signal (PS_ON) and is for outputting a delayed power-on signal.

Preferably, the first transistor ($Q_1$) is an N-channel metal-oxide-semiconductor field effect transistor (N-MOSFET), and has a gate serving as a control terminal, a drain serving as a first terminal, and a source serving as a second terminal. The control terminal of the first transistor ($Q_1$) is coupled to the delay circuit 41 to receive the delayed power-on signal therefrom. The second terminal of the first transistor ($Q_1$) is grounded.

The first resistor ($R_1$) interconnects electrically the first power supply module 10 and the first terminal of the first transistor ($Q_1$).

The second transistor ($Q_2$) is an NPN BJT, and has a base serving as a control terminal, a collector serving as a first terminal, and an emitter serving as a second terminal. The control terminal of the second transistor ($Q_2$) is coupled to the first terminal of the first transistor ($Q_1$). The second terminal of the second transistor ($Q_2$) is grounded.

The second resistor ($R_2$) interconnects electrically the control terminal of the switching transistor (Qs) and the first terminal of the second transistor ($Q_2$). The third resistor ($R_3$) is connected across the first terminal and the control terminal of the switching transistor (Qs).

In this example, when the power converter 200 is to be activated (e.g., by a user switching on the power converter 200), the power-on signal (PS_ON) is switched from the high voltage level to the low voltage level. The first power supply module 10 is configured to output the first voltage ($Vo_1$) as a response, and the second power supply module 20 in turn is configured to output the second voltage ($Vo_2$). The switching transistor (Qs) and the second transistor ($Q_2$) conduct, and the switching diode (Ds) is reverse biased. As a result, only electrical current from the first power supply module 10 ($Io_1$) is allowed to flow in the switching unit 30 (i.e., the current from the second power supply module 20 ($Io_2$) is cut off). The first voltage ($Vo_1$) is then fed to the relay 210 in order to activate the same.

The power-on signal (PS_ON) is simultaneously fed to the delay circuit 41 of the control module 40, and the delay circuit 41 is configured to output the delayed power-on signal to the control terminal of the first transistor ($Q_1$), causing the same to conduct. The switching transistor (Qs) and the second transistor ($Q_2$) are subsequently cut-off, and the switching diode (Ds) is forward biased. As a result, only electrical current from the second power supply module 20 ($Io_2$) is allowed to flow in the switching unit 30 (i.e., the current from the first power supply module 10 ($Io_1$) is cut off). Subsequently, the second voltage ($Vo_2$) is fed to the relay 210 in order to maintain the activated state of the same.

It is noted that, in order to activate the relay 210, the first voltage ($Vo_1$) must be fed to the relay 210 for a time period. That being said, the delay circuit 41 needs to output the delayed power-on signal after the time period has elapsed to ensure that the relay 210 is already in the activated state before switching to provide the second voltage ($Vo_2$) to the relay 210. In this example, since the delay circuit 41 is an RC circuit, the delay circuit 41 must be configured to have a time constant larger than the time period.

Figure 5:
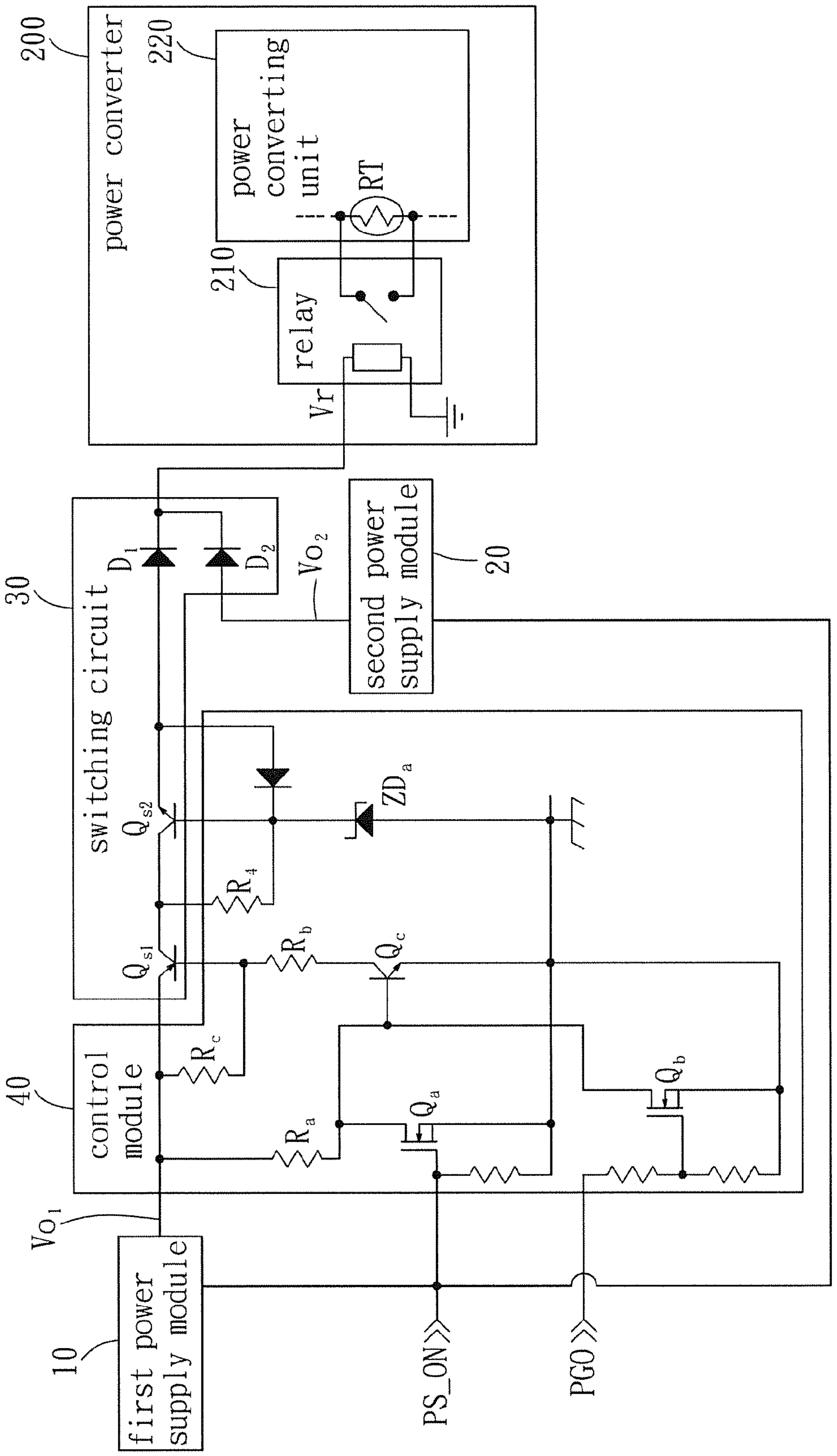
FIG. 5 is a detailed schematic circuit diagram showing the relay driving device of FIG. 1, according to another example.

FIG. 5 is a schematic circuit diagram illustrating the detailed circuit arrangement of the components of the relay driving device 100, in accordance with another example. In this example, each of the first and second power supply modules 10 and 20 is an external voltage source, and is activated in response to the power-on signal (PS_ON) switching to the low voltage level. The power-on signal (PS_ON) and the a delay signal (PGO) are implemented using two individual external signal sources, and the delay signal (PGO) is configured to be outputted after the power-on signal (PS_ON) has been outputted for a predetermined delay time (see FIG. 6).

The switching circuit 30 includes a first switching transistor ($Qs_1$), a first switching diode ($D_1$), a second switching diode ($D_2$), and a second switching transistor ($Qs_2$). The first and second switching diodes ($D_1$) and ($D_2$) are disposed such that the first and second power supply modules 10 and 20 are to be coupled to the relay through the first and second switching diodes ($D_1$) and ($D_2$), respectively.

In this embodiment, the first switching transistor ($Qs_1$) is a PNP BJT, and has a base serving as a control terminal, an emitter serving as a first terminal, and a collector serving as a second terminal. The first terminal of the first switching transistor ($Qs_1$) is coupled to the first power supply module 10.

The second switching transistor ($Qs_2$) is a NPN BJT, and has abase serving as a control terminal, a collector serving as a first terminal, and an emitter serving as a second terminal. The first terminal of the second switching transistor ($Qs_2$) is coupled to the second terminal of the first switching transistor ($Qs_1$). The second terminal of the second switching transistor ($Qs_2$) is coupled to the first switching diode ($D_1$).

The control unit 40 includes a first transistor (Qa), a first resistor (Ra), a second transistor (Qb), a third transistor (Qc), a second resistor (Rb), a third resistor (Rc), a Zener diode (ZDa), and a fourth resistor ($R_4$).

The first transistor (Qa) is an N-MOSFET in this example, and has a gate serving as a control terminal, a drain serving as a first terminal, and a source serving as a second terminal. The control terminal of the first transistor (Qa) is disposed to receive the power-on signal (PS_ON). The second terminal of the first transistor (Qa) is grounded.

The first resistor (Ra) interconnects electrically the first power supply module 10 and the first terminal of the first transistor (Qa).

The second transistor (Qb) is an N-MOSFET in this example, and has a gate serving as a control terminal, a drain serving as a first terminal, and a source serving as a second terminal. The first terminal of the second transistor (Qb) is coupled to the first terminal of the first transistor (Qa). The control terminal of the second transistor (Qb) is disposed to receive the delay signal (PGO). The second terminal of the second transistor (Qb) is grounded.

The third transistor (Qc) is a NPN BJT, and has a base serving as a control terminal, a collector serving as a first terminal, and an emitter serving as a second terminal. The control terminal of the third transistor (Qc) is coupled to the first terminal of the first transistor (Qa). The second terminal of the third transistor (Qc) is grounded.

The second resistor (Rb) interconnects electrically the control terminal of the first switching transistor ($Qs_1$) and the first terminal of the third transistor (Qc). The third resistor (Rc) is connected across the first terminal and the control terminal of the first switching transistor ($Qs_1$). The fourth resistor ($R_4$) is connected across the first terminal and the control terminal of the second switching transistor ($Qs_2$).

Figure 6:
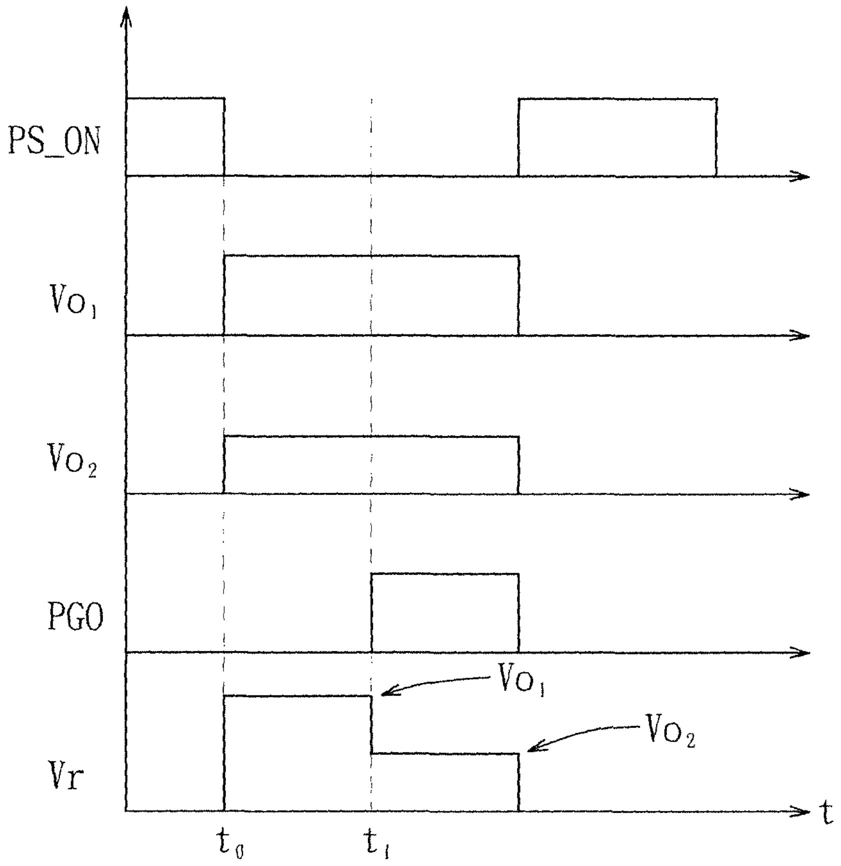
FIG. 6 is a timing diagram illustrating states of various voltage and current signals during operation of the relay driving device of FIG. 5.

The operation of the relay driving device 100 according to the example shown in FIG. 5 will now be described. With further reference to FIG. 6, at the time $t_0$, when the power converter 200 is to be activated (i.e., sending the power-on signal (PS_ON) to the relay driving device 100), each of the first and second power supply modules 10 and 20 is configured to output respectively the first voltage ($Vo_1$) and the second voltage ($Vo_2$), in response to the voltage level switch of the power-on signal (PS_ON). At this time, both the power-on signal (PS_ON) and the delay signal (PGO) have the low voltage level, thereby cutting off the first and second transistors (Qa, Qb). The first voltage ($Vo_1$) is able to cause the first and second switching transistors ($Qs_1$, $Qs_2$) and the first diode ($D_1$) to conduct, and the second diode ($D_2$) is reverse biased. Therefore, the first voltage ($Vo_1$) is fed to the relay 210.

After the predetermined delay time (between 100 to 500 milliseconds, in this example) has elapsed, the delay signal (PGO) is configured to switch to the high voltage level at the time $t_1$. This in turn causes the second transistor ($Q_b$) to conduct, cutting off the third transistor ($Q_c$) and the first and second switching transistors ($Qs_1$, $Qs_2$), and the first diode ($D_1$) is reverse biased. Subsequently, the second diode ($D_2$) is forward biased, and the second voltage ($Vo_2$) is then fed to the relay 210.

To sum up, a relay driving device 100 in accordance with the preferred embodiment is capable of reducing the overall power consumption of the relay 210. Additionally, the relay driving device 100 is a peripheral device that can be connected to the relay 210 instead of altering the circuitry arrangement of the same. The relay driving device 100 can be a relatively inexpensive alternative compared with replacing the electrical components of the relay 210 with ones of better quality.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A relay driving device for driving a relay, said relay driving device comprising:

a first power supply module for outputting a first voltage that has a magnitude sufficient to activate the relay;

a second power supply module for outputting a second voltage that has a magnitude lower than that of the first voltage and sufficient to maintain an activated state of the relay;

a switching circuit coupled to said first and second power supply modules and to be coupled to the relay; and a control module coupled to said switching circuit and configured to control said switching circuit to connect the relay to said first power supply module and to disconnect the relay from said second power supply module so as to provide the first voltage to the relay for activating the relay, and to subsequently connect the relay to said second power supply module and to disconnect the relay from said first power supply module so as to provide the second voltage to the relay for maintaining the activated state of the relay;

wherein said switching circuit includes a switching transistor for coupling said first power supply module to the relay, and a switching diode for coupling said second power supply module to the relay.

2. The relay driving device according to claim 1, wherein the magnitude of the second voltage is not less than a lowest excitation voltage of the relay.

3. A relay driving device for driving a relay, said relay driving device comprising:

a first power supply module for outputting a first voltage that has a magnitude sufficient to activate the relay;

a second power supply module for outputting a second voltage that has a magnitude lower than that of the first voltage and sufficient to maintain an activated state of the relay;

a switching circuit coupled to said first and second power supply modules and to be coupled to the relay; and a control module coupled to said switching circuit and configured to control said switching circuit to connect the relay to said first power supply module and to disconnect the relay from said second power supply module so as to provide the first voltage to the relay for activating the relay, and to subsequently connect the relay to said second power supply module and to disconnect the relay from said first power supply module so as to provide the second voltage to the relay for maintaining the activated state of the relay;

wherein said second power supply module is disposed to receive the first voltage from said first power supply module, and includes a voltage dividing capacitor and a Zener diode coupled across said voltage dividing capacitor, the second voltage being a divided voltage of the first voltage, the divided voltage being across said voltage dividing capacitor and said Zener diode.

4. The relay driving device according to claim 1, wherein said switching transistor includes a first terminal coupled to said first power supply module, a second terminal to be coupled to the relay, and a control terminal, and said control module includes:

a delay circuit for receiving a power-on signal and for outputting a delayed power-on signal;

a first transistor having a first terminal, a second terminal, and a control terminal coupled to said delay circuit to receive the delayed power-on signal therefrom;

a first resistor interconnecting electrically said first power supply module and said first terminal of said first transistor;

a second transistor having a first terminal, a second terminal, and a control terminal coupled to said first terminal of said first transistor;

a second resistor interconnecting electrically said control terminal of said switching transistor and said first terminal of said second transistor; and a third resistor connected across said first terminal and said control terminal of said switching transistor.

5. The relay driving device according to claim 4, wherein said delay circuit includes a delay capacitor and a delay resistor connected in parallel to each other.

6. The relay driving device according to claim 4, wherein:

said switching transistor is a PNP bipolar junction transistor (BJT) having a base serving as said control terminal, an emitter serving as said first terminal, and a collector serving as said second terminal;

said first transistor is a N-channel metal-oxide-semiconductor field effect transistor (N-MOSFET) having a gate serving as said control terminal, a drain serving as said first terminal, and a source serving as said second terminal; and said second transistor is an NPN BJT having a base serving as said control terminal, a collector serving as said first terminal, and an emitter serving as said second terminal.

7. The relay driving device according to claim 4, wherein said delay circuit is configured to output the delayed power-on signal a predetermined delay time after receiving the power-on signal, the predetermined delay time being longer than a time period required to activate the relay using the first voltage.

8. A relay driving device for driving a relay, said relay driving device comprising:

a first power supply module for outputting a first voltage that has a magnitude sufficient to activate the relay;

a second power supply module for outputting a second voltage that has a magnitude lower than that of the first voltage and sufficient to maintain an activated state of the relay;

a switching circuit coupled to said first and second power supply modules and to be coupled to the relay; and a control module coupled to said switching circuit and configured to control said switching circuit to connect the relay to said first power supply module and to disconnect the relay from said second power supply module so as to provide the first voltage to the relay for activating the relay, and to subsequently connect the relay to said second power supply module and to disconnect the relay from said first power supply module so as to provide the second voltage to the relay for maintaining the activated state of the relay;

wherein said switching circuit includes a first switching transistor coupled to said first power supply module, a first switching diode through which said first switching transistor is to be coupled to the relay, and a second switching diode for coupling said second power supply module to the relay.

9. The relay driving device according to claim 8, wherein said first switching transistor includes a first terminal coupled to said first power supply module, a second terminal, and a control terminal, and said control module includes:

a first transistor having a first terminal, a second terminal, and a control terminal disposed to receive a power-on signal;

a first resistor interconnecting electrically said first power supply module and said first terminal of said first transistor;

a second transistor having a first terminal coupled to said first terminal of said first transistor, a second terminal, and a control terminal disposed to receive a delay signal;

a third transistor having a first terminal, a second terminal, and a control terminal coupled to said first terminal of said first transistor;

a second resistor interconnecting electrically said control terminal of said first switching transistor and said first terminal of said third transistor; and a third resistor connected across said first terminal and said control terminal of said first switching transistor.

10. The relay driving device according to claim 9, wherein said switching circuit further includes a second switching transistor having a first terminal coupled to said second terminal of said first switching transistor, a second terminal coupled to said first switching diode, and a control terminal, and said control module further includes:

a Zener diode coupled to said control terminal of said second switching transistor; and a fourth resistor connected across said first terminal and said control terminal of said second switching transistor.

11. The relay driving device according to claim 10, wherein:

each of said first transistor and said second transistor is a N-channel metal-oxide-semiconductor field effect transistor (N-MOSFET) having a gate serving as said control terminal, a drain serving as said first terminal, and a source serving as said second terminal;

each of said third transistor and said second switching transistor is an NPN bipolar junction transistor (BJT) having a base serving as said control terminal, a collector serving as said first terminal, and an emitter serving as said second terminal; and said first switching transistor is a PNP BJT having a base serving as said control terminal, an emitter serving as said first terminal, and a collector serving as said second terminal.

12. A method for driving a relay, the method to be implemented by a relay driving device electrically connected to the relay, the relay driving device including a first power supply module and a second power supply module, said method comprising the following steps of:

providing a switching circuit that is coupled to the first and second power supply modules, and that is to be coupled to the relay, wherein the switching circuit includes a switching transistor for coupling the first power supply module to the relay, and a switching diode for coupling the second power supply module to the relay;

configuring the first power supply module of the relay driving device to output a first voltage to the relay via the switching circuit, the first voltage having a magnitude that is sufficient to activate the relay; and configuring the second power supply module of the relay driving device to output a second voltage to the relay via the switching circuit for maintaining an activated state of the relay, the second voltage having a magnitude lower than that of the first voltage.

13. The method according to claim 12, wherein the magnitude of the second voltage is not less than a lowest excitation voltage of the relay.

14. The method according to claim 12, wherein the relay driving device is configured to output the second voltage after the first voltage has been outputted for a predetermined time, the predetermined time being longer than a time period required to activate the relay using the first voltage.

* * * * *

UNITED STATES PATENT AND TRADEMARK OFFICE

CERTIFICATE OF CORRECTION

PATENT NO. : 9,336,976 B2
APPLICATION NO. : 13/783744
DATED : May 10, 2016
INVENTOR(S) : Chih-Tai Chen and Ming-Yang Tsai It is certified that error appears in the above-identified patent and that said Letters Patent is hereby corrected as shown below:

IN THE TITLE PAGE:

Item [71] INSERT THE ADDITIONAL APPLICANT --LITE-ON TECHNOLOGY CORP., TAIPEI (TW)--

Signed and Sealed this
Twenty-sixth Day of July, 2016

Michelle K. Lee

Michelle K. Lee
*Director of the United States Patent and Trademark Office*